US011478834B2

(12) United States Patent
Wilhelm et al.

(10) Patent No.: US 11,478,834 B2
(45) Date of Patent: Oct. 25, 2022

(54) PROCESSING PLANAR WORKPIECES

(71) Applicant: TRUMPF Werkzeugmaschinen GmbH + Co. KG, Ditzingen (DE)

(72) Inventors: Markus Wilhelm, Gerlingen (DE); Rainer Hank, Eberdingen/Hochdorf (DE); Marc Klinkhammer, Ditzingen (DE); Leonard Schindewolf, Rutesheim (DE); Simon Ockenfuss, Boeblingen (DE); Jens Kappes, Leinfelden-Echterdingen (DE); Dennis Traenklein, Nufringen (DE); Alexander Tatarczyk, Hoeffingen (DE); Joerg Neupert, Stuttgart (DE); Dominik Bitto, Muenchingen (DE); Markus Maatz, Leinfelden-Echterdingen (DE); Christian Jakisch, Boeblingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 887 days.

(21) Appl. No.: 16/361,635

(22) Filed: Mar. 22, 2019

(65) Prior Publication Data
US 2019/0217361 A1 Jul. 18, 2019

Related U.S. Application Data

(63) Continuation of application No. PCT/EP2017/074281, filed on Sep. 26, 2017.

(30) Foreign Application Priority Data

Sep. 26, 2016 (DE) .......................... 102016118175.7

(51) Int. Cl.
*B21D 19/08* (2006.01)
*B21D 35/00* (2006.01)
(Continued)

(52) U.S. Cl.
CPC ........... *B21D 19/08* (2013.01); *B21D 35/001* (2013.01); *B21D 37/12* (2013.01); *B23K 26/38* (2013.01); *B21D 37/08* (2013.01)

(58) Field of Classification Search
CPC ........ B21D 37/08; B21D 37/12; B21D 19/08; B23K 26/38
(Continued)

(56) References Cited

U.S. PATENT DOCUMENTS 4,674,373 A * 6/1987 Kuppinger ............. B23D 27/00
83/916
4,696,211 A * 9/1987 Bitzel .................... B21D 28/04
83/916

(Continued)

FOREIGN PATENT DOCUMENTS

| DE | 102011088673 | 6/2013 |
| EP | 2527058 | 7/2014 |
| EP | 3106241 | 12/2016 |

OTHER PUBLICATIONS

International Preliminary Report on Patentability in International Application No. PCT/EP2017/074281, dated Mar. 26, 2019, 8 pages (English translation).

(Continued)

*Primary Examiner* — Jimmy Chou
(74) *Attorney, Agent, or Firm* — Fish & Richardson P.C.

(57) ABSTRACT

A machine tool for machining planar workpieces includes an upper tool, a lower tool, a machine frame, and a controller. The upper tool is movable with a stroke movement along a stroke axis by a stroke drive device in a direction towards a workpiece and in the opposite direction and positionable with an upper traversing movement along an upper positioning axis by a motor drive assembly. The lower tool is aligned with the upper tool and is positionable with a lower traversing movement along a lower positioning axis by a (Continued)

motor drive assembly. The upper and lower tools are movable in a frame interior of the machine frame. The motor drive assemblies can be controlled by the controller. The upper and lower traversing movements can be controllable independently of each other. The upper tool can be controlled with the upper traversing movement and the stroke movement in a superposed manner.

20 Claims, 6 Drawing Sheets

(51) Int. Cl.
*B21D 37/12* (2006.01)
*B23K 26/38* (2014.01)
*B21D 37/08* (2006.01)

(58) Field of Classification Search
USPC ......... 83/916, 917, 682, 684, 685, 687, 692, 83/693, 689, 49, 56, 636; 72/452.9; 219/121.7
See application file for complete search history.

(56) References Cited

U.S. PATENT DOCUMENTS

| | | | | |
|---|---|---|---|---|
| 4,771,663 A * | 9/1988 | Naito | ............... | B23D 27/00 83/237 |
| 4,981,058 A * | 1/1991 | Gavrun, III | ............ | B21D 28/12 83/636 |
| 5,156,034 A * | 10/1992 | Lorbach | .............. | B21D 5/14 72/10.6 |
| 5,195,413 A * | 3/1993 | Johnson | ............ | B23D 33/08 83/636 |
| 5,377,519 A * | 1/1995 | Hayashi | ............... | B23D 31/00 72/326 |
| 5,555,759 A * | 9/1996 | Rosene | .............. | B21D 17/04 72/182 |
| 5,575,168 A * | 11/1996 | Rosene | .............. | B21D 28/12 72/182 |
| 5,787,775 A * | 8/1998 | Stevens | ............... | B21D 28/12 83/552 |
| 5,937,694 A * | 8/1999 | Mueller | ................ | B30B 1/40 72/429 |
| 6,112,568 A * | 9/2000 | Lindstrom | ............ | B21D 28/12 72/472 |
| 7,640,777 B2 * | 1/2010 | Sakamoto | ............. | B21D 28/12 72/448 |
| 8,680,423 B2 * | 3/2014 | Binder | ................. | B23K 11/314 219/90 |
| 9,040,866 B2 * | 5/2015 | Tanaka | ................. | B23K 11/115 219/86.33 |
| 9,839,952 B2 * | 12/2017 | Kraft | ....................... | B21D 28/34 |
| 11,325,176 B2 * | 5/2022 | Wilhelm | ................ | B21D 28/34 |
| 2003/0106404 A1 * | 6/2003 | Graf | ...................... | B23D 27/00 83/237 |
| 2004/0169069 A1 * | 9/2004 | Ostini | ..................... | B21D 28/12 83/687 |
| 2008/0078748 A1 * | 4/2008 | Binder | ................. | B23K 11/255 219/90 |
| 2009/0188364 A1 * | 7/2009 | Lahtinen | ............... | B21D 28/26 83/685 |
| 2010/0018277 A1 * | 1/2010 | Hielscher | ............ | C21D 8/0252 72/352 |
| 2011/0143639 A1 * | 6/2011 | Bando | .................. | B65G 49/066 225/2 |
| 2013/0000456 A1 * | 1/2013 | Matsumura | ............ | B23D 27/00 83/685 |
| 2013/0228000 A1 * | 9/2013 | Eguchi | ................... | B21D 24/16 72/347 |
| 2013/0276603 A1 * | 10/2013 | Matsumura | .......... | B21D 28/343 83/682 |
| 2014/0090443 A1 * | 4/2014 | Schmauder | ........... | B21D 28/20 83/627 |
| 2015/0069026 A1 * | 3/2015 | Cielinski | .............. | B23K 11/315 318/135 |
| 2015/0290826 A1 * | 10/2015 | Saito | ...................... | B23D 27/00 83/72 |
| 2015/0306653 A1 | 10/2015 | Mathias et al. | | |
| 2016/0250709 A1 * | 9/2016 | Matsushita | ............ | B23K 11/16 219/86.1 |
| 2016/0368040 A1 * | 12/2016 | Traenklein | ............. | B21D 22/02 |

OTHER PUBLICATIONS

International Search Report and Written Opinion in International Application No. PCT/EP2017/074281, dated Jan. 19, 2018, 16 pages (with English translation).

* cited by examiner

PROCESSING PLANAR WORKPIECES

CROSS REFERENCE TO RELATED APPLICATIONS

This application is a continuation of and claims priority under 35 U.S.C. § 120 from PCT Application No. PCT/EP2017/074281 filed on Sep. 26, 2017, which claims priority from German Application No. DE 10 2016 118 175.7, filed on Sep. 26, 2016. The entire contents of each of these priority applications are incorporated herein by reference.

TECHNICAL FIELD

The invention relates to a machine tool and a method for processing planar workpieces, preferably metal sheets.

BACKGROUND

Document EP 3 106 241 A1 discloses a machine tool for processing planar workpieces. This machine tool comprises an upper tool, which is moveable along a stroke axis by means of an upper stroke drive device in the direction of a workpiece to be processed by the upper tool and in the opposite direction, and which is moveable by means of a motor drive assembly along an upper positioning axis running perpendicular to the stroke axis. The upper tool is paired with a lower tool, which is moveable along a lower positioning axis by means of a motor drive. The upper tool and lower tool are each moveable independently of one another along their respective positioning axes in a frame interior of a machine frame. This machine frame is associated with two workpiece rests for receiving the workpiece, in order to position the workpiece between upper tool and the lower tool for the processing.

A further machine tool is known from EP 2 527 058 B1. That document discloses a machine tool in the form of a press for processing workpieces, wherein an upper tool is provided on a stroke device, which is moveable, relative to a workpiece to be processed, along a stroke axis in the direction of the workpiece and in the opposite direction. A lower tool is provided in the stroke axis and opposite the upper tool and is positioned towards a lower side. A stroke drive device for a stroke movement of the upper tool is controlled by a wedge gear. The stroke drive device with the upper tool arranged thereon is moveable along a positioning axis. The lower tool is moved synchronously with the upper tool.

SUMMARY

One of the objects of the invention is to propose a machine tool and a method by means of which the versatility of the processing of workpieces is increased.

One aspect of the invention features a workpiece machine for processing, in particular for cutting and/or shaping, planar workpieces, preferably metal sheets, in which the upper tool can be controlled with a traversing movement along the upper positioning axis and a movement along the stroke axis of the upper stroke drive device in a superposed manner. In addition, it is possible to reduce the process time as a result of the superposed traversing movement along the upper positioning axis and along the upper stroke axis. A decoupled movement of the upper tool and the lower tool, or rather a decoupled movement of the upper tool relative to the lower tool and vice versa may also be made possible. This opens up a large number of possibilities for the processing of workpieces by means of cutting, punching, shaping and/or a combination hereof, and also by means of inscribing, engraving or the like. In addition, for example when the upper tool is formed as a punching tool, there is no need to provide a defined positioning of a tool body having at least one cutting edge or a punch relative to the stroke axis and, correspondingly, when the lower tool is formed as a die, there is no need to provide a defined positioning of a tool body having at least one counter cutting edge relative to the stroke axis, because the punch and the die can be arranged in positions relative to one another by means of the controller on account of the independent movability of the upper tool and/or of the lower tool.

It is preferably provided that the traversing movement of the upper tool and of the lower tool can be controlled simultaneously and, in respect of the direction of movement and/or speed of movement, independently, in each case by means of a motor drive assembly. The traversing movement of the upper tool and of the lower tool therefore indeed may be controlled simultaneously; however, a synchronous traversing movement is not necessary. Rather, the traversing movement of the upper tool may be performed in a manner deviating from that of the lower tool.

A further advantageous embodiment of the machine tool provides that the lower tool is moveable along the stroke axis towards the workpiece and in the opposite direction by a stroke drive device. It is preferably provided that a traversing movement along the lower positioning axis of the lower tool can be controlled together with a stroke movement along the lower stroke drive device in a superposed manner. Thus, both the upper tool and the lower tool can be controlled so as to be moveable each by means of a stroke drive device along the stroke axis, moreover independently of one another. A further increase in the versatility of the processing is thus attained.

It is furthermore preferably provided that the upper stroke drive device and the lower stroke drive device are each controllable independently of one another by the controller of the machine tool. This stroke movement can be superposed with the traversing movement and selected and controlled both for the upper tool and for the lower tool. The versatility of the processing of workpieces and of the processing direction is thus increased. For example, deviating from a processing direction perpendicular to the workpiece plane or along the stroke axis in the Z direction, a stroke movement of the upper tool and/or of the lower tool in which traversing movements along a positioning axis in the Y direction and along the stroke axis in the Z direction are superposed can be made possible. Oblique cuts in relation to the Z axis can thus also be made in the workpiece.

Furthermore, it is preferably provided that, adjacently to the machine frame, at least one workpiece rest bordering the frame interior of the machine frame is provided, on which workpiece rest the planar workpiece can be positioned in a rest plane. This workpiece rest is for example associated with a loading unit and/or unloading unit. The workpiece machine can thus be provided with planar workpieces in a simple way. The workpiece can be moved relative to the frame interior by means of a feed device and a clamping device or grippers arranged thereon, so as to arrange the workpiece in the desired processing position between upper tool and lower tool. A workpiece rest is preferably provided on each side of the machine frame, such that an unprocessed workpiece can be positioned on one side of the machine frame and this workpiece can be guided through the open, in particular C-shaped, machine frame or closed machine frame by means of the feed device. Large parts or a sheet skeleton can be transported out and unloaded from the machine frame via the further workpiece rest surface. If one or more workpiece parts are discharged downwardly through the machine frame, the further workpiece rest can also be used in turn to provide a new workpiece, whereby productivity can be increased.

It is furthermore preferably provided that the feed device is provided adjacently to the workpiece rest and in a manner crossing through the frame interior, by means of which feed device the workpiece can be displaced relative to the upper and lower tool. For example, the workpiece thus can be moved in and against the X direction, whereas the upper and/or lower tool are/is moveable in the machine frame in and against the Y direction. Any desired position for the machining of the workpiece can thus be assumed within a processing space in the frame interior, whereby it is made possible to process the workpiece over its entire area.

It is furthermore preferably provided that the lower tool can be lowered into a position lowered relative to a rest plane of the workpiece rest and can be passed over by at least one workpiece rest, and a rest plane closed or closable by the workpiece rest preferably can be formed in the frame interior. This makes it possible, after the processing of the workpiece, for the workpiece to be transported reliably, with partly cut-free workpiece parts therein or workpiece parts attached to the sheet skeleton by means of a remaining connection, to a subsequent processing operation or a discharge operation. A parts chute can be integrated between the workpiece rests in the region of the lowerable lower tool and is openable downwardly in order to also discharge parts downwardly into the machine space. By lowering the lower tool, it is also possible to avoid the occurrence of damage, in particular scratches, on an underside of the workpiece as the lower tool is passed over.

Furthermore, it is preferably provided that the upper and lower stroke drive device are of the same design. A cost reduction for the production of the machine tools can thus be made possible. The drive assemblies for the control of the traversing movement of the upper and lower stroke drive device are also of the same design.

The machine frame for the machine tool can be configured as a C frame or as a closed frame. A corresponding machine frame can be configured depending on the size of the machine and the processing forces.

A further advantageous embodiment of the machine tool provides that the machine frame is associated with at least one further workpiece processing device or a further workpiece processing device is arranged on the machine frame and is moveable in the X, Y and/or Z direction. Two different processing operations can thus be performed on the same workpiece in the machine tool, preferably by means of a gripping position by grippers.

The further tool processing device is preferably moveable parallel to the upper and lower tool, in particular along an upper horizontal frame limb of the machine frame. The structure of the machine tool by means of the upper and lower tool and the at least one workpiece rest associated with the machine frame can thus be retained, and an additional processing of the workpieces can be integrated.

This further workpiece processing device is preferably controlled so as to be moveable independently of the upper and/or lower tool.

The workpiece processing device is preferably configured as a laser processing device, in which in particular at least one laser processing head is moveable along the machine frame. For example, both a laser processing, such as cutting, welding or inscribing, and a punching processing and/or a shaping and/or inscribing of the workpiece thus can be performed in the machine tool. For example, a punching processing or a shaping of the workpiece can be carried out, and thereafter, before the workpiece part is separated from the workpiece, an inscribing or marking can be performed by means of the laser. A marking of this kind may remain on the workpiece part, such that the production time and/or the production location can be traced at a later time.

A laser processing head is advantageously arranged on the machine frame so as to be moveable by means of an at least single-axis linear drive. An exact guidance and control of a processing position of the laser processing head relative to the workpiece thus can be made possible.

Furthermore, it is preferably provided that the drive assembly of the upper tool and/or of the lower tool and/or the laser processing device are controllable independently of one another by a controller, preferably a common controller.

Another aspect of the invention features a method for processing planar workpieces, in particular metal sheets, by means of a machine tool, in which an upper tool, which is moveable in the direction of a workpiece to be processed by means of the upper tool and in the opposite direction along an upper axis by means of a stroke drive device, is positioned by means of at least one motor drive assembly along an upper positioning axis running perpendicular to the stroke axis, and in which a lower tool, which is oriented relative to the upper tool, is positioned by means of at least one motor drive assembly along a lower positioning axis, which is oriented perpendicular to the stroke axis of the upper tool, and in which the upper and lower tool are moved in the frame interior of a machine frame, in which the motor drive assemblies are controlled by means of a controller in order to move the upper and lower tool, and in which a workpiece is positioned between upper and lower tool and the traversing movement of the upper tool along the upper positioning axis and the traversing movement of the lower tool along the lower positioning axis are controlled independently of one another, wherein the upper tool is controlled with a traversing movement along the upper positioning axis thereof and a stroke movement along the stroke axis of the upper stroke drive assembly in a superposed manner. This enables a greater versatility of the use of the tools. The upper and lower tool can be freely selected in respect of the arrangement, for example, of a cutting edge on the upper tool and a counter cutting edge on the lower tool. There is no need to make an adjustment of the spacing of the positioning axes of said tools, since a freely selectable positioning, for example, of a cutting edge relative to a counter cutting edge is made possible by the independent traversing movement of the upper tool and lower tool along their respective positioning axes. Different spacings between the cutting edge and the counter cutting edge thus can be set in a simple way, for example in order to set a cutting gap width. This versatility of the processing can be provided not only for cutting or punching processing, but also for shaping, bending, inscribing, engraving or further possibilities for workpiece processing.

It is preferably provided that the upper tool and/or the lower tool are controlled with a traversing movement along the positioning axis and a stroke movement along the stroke axis in a superposed manner. This enables a stroke movement of the upper tool relative to the lower tool along a path that lies outside a stroke axis and that, for example, is oriented in the Z direction. The superposition of the traversing movement and the stroke movement can be controlled arbitrarily.

Both stroke movements running obliquely and arcuate or curved stroke profiles can preferably be controlled. The trajectory of the stroke movement can be selected in a manner specific to the application. For example, a plurality of successive linear stroke movements which differ from one another in respect of direction can also be controlled. A combination of one or more linear stroke movements and one or more curved stroke movements can also be combined with one another.

Furthermore, it can be provided that, for example, the upper tool is controlled with a superposition of the traversing movement in the Y direction and a stroke movement in the Z direction, whereas the lower tool is still or stationary. This control of the upper and lower tool can also be swapped. It can also be provided that, for example, the upper tool is controlled with a superposed traversing movement and stroke movement, whereas the lower tool is controlled only with a stroke movement or only with a traversing movement along the positioning axis. The same is also true for a swapped arrangement of the upper tool and lower tool.

A further advantageous embodiment of the method provides that a workpiece, in particular a workpiece edge, is processed by means of an upper tool which has a tool body of which the longitudinal axis lies parallel to or in a positioning axis of the upper tool and comprises at least one cutting edge, which preferably is oriented at right angles to the positioning axis. An upper tool of this kind can be controlled by a superposed traversing movement along the positioning axis and a stroke movement along the stroke axis, such that, for example, the upper tool is acted on with a stroke movement of a working stroke having a stroke direction inclined or oblique to the stroke axis, for example in order to remove a part edge on the workpiece. With a linear stroke movement that is inclined or oblique to the stroke axis, a chamfer can be produced, for example. The angle of the chamfer can be influenced depending on the inclination of the linear stroke movement relative to the stroke axis. Furthermore, it is also possible in this way to influence whether the chamfer extends merely over a small part of the thickness or over half the thickness of the workpiece or even fully along the end face of the workpiece. With a superposition of the traversing movement of the upper tool along the upper positioning axis and a stroke movement along the stroke axis in order to attain a curved stroke movement or arcuate stroke movement, rounded part edges can also be produced on the workpiece.

It is preferably provided that the upper tool and/or the lower tool are oriented relative to one another by the stroke drive device by rotating the upper tool and/or lower tool about the stroke axis, or by rotating the upper tool and/or lower tool about their respective positioning axes. This control of the rotary movement of the upper tool and/or lower tool of the upper and lower stroke drive device can again be performed for the tools independently of one another.

When processing planar workpieces in a machine tool of the above-mentioned type, it is preferably provided that the workpiece is held still or stationary during a working stroke of the upper tool and/or the lower tool.

DESCRIPTION OF DRAWINGS

The invention and further advantageous embodiments and developments thereof will be described and explained in greater detail hereinafter with reference to the examples shown in the drawings. The features inferred from the description and the drawings can be applied in accordance with the invention individually or in any combination. In the drawings.

DETAILED DESCRIPTION

Figure 1:
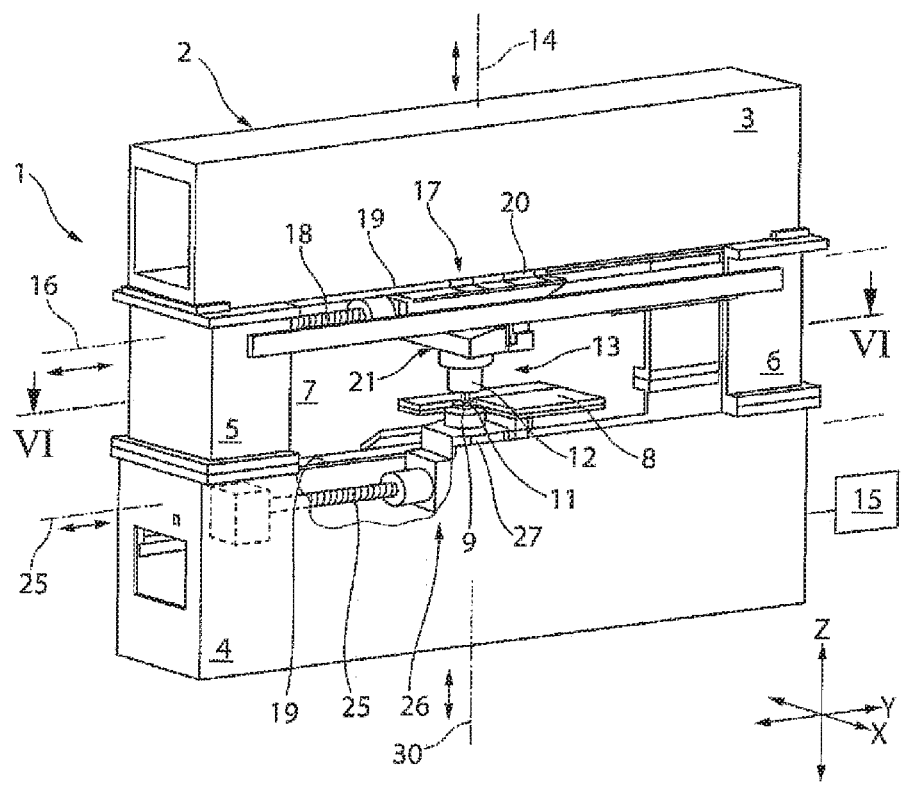
FIG. 1 shows a perspective view of the machine tool.

FIG. 1 shows a machine tool 1 which is configured as a punch press. This machine tool 1 comprises a supporting structure with a closed machine frame 2. This comprises two horizontal frame limbs 3, 4 and two vertical frame limbs 5 and 6. The machine frame 2 surrounds a frame interior 7, which forms the working area of the machine tool 1 with an upper tool 11 and a lower tool 9.

The machine tool 1 is used to process planar workpieces 10, which for the sake of simplicity have not been shown in FIG. 1 and can be arranged in the frame interior 7 for processing purposes. A workpiece 10 to be processed is placed on a workpiece support 8 provided in the frame interior 7. The lower tool 9, for example in the form of a die, is mounted in a recess in the workpiece support 8 on the lower horizontal frame limb 4 of the machine frame 2. This die can be provided with a die opening. In the case of a punching operation the upper tool 11 formed as a punch dips into the die opening of the lower tool formed as a die.

The upper tool 11 and lower tool 9, instead of being formed by a punch and a die for punching, can also be formed by a bending punch and a bending die for shaping workpieces 10.

The upper tool 11 is fixed in a tool receptacle on a lower end of a ram 12. The ram 12 is part of a stroke drive device 13, by means of which the upper tool 11 can be moved in a stroke direction along a stroke axis 14. The stroke axis 14 runs in the direction of the Z axis of the coordinate system of a numerical controller 15 of the machine tool 1 indicated in FIG. 1. The stroke drive device 13 can be moved perpendicular to the stroke axis 14 along a positioning axis 16 in the direction of the double-headed arrow. The positioning axis 16 runs in the direction of the Y direction of the coordinate system of the numerical controller 15. The stroke drive device 13 receiving the upper tool 11 is moved along the positioning axis 16 by means of a motor drive 17.

The movement of the ram 12 along the stroke axis 14 and the positioning of the stroke drive device 13 along the positioning axis 16 are achieved by means of a motor drive 17, which can be configured in the form of a drive assembly 17, in particular a spindle drive assembly, with a drive spindle 18 running in the direction of the positioning axis 16 and fixedly connected to the machine frame 2. The stroke drive device 13, in the event of movements along the positioning axis 16, is guided on two or three guide rails 19 of the upper frame limb 3, of which guide rails 19 can be seen in FIG. 1. The other guide rail 19 runs parallel to the visible guide rail 19 and is distanced therefrom in the direction of the X axis of the coordinate system of the numerical controller 15. Guide shoes 20 of the stroke drive device 13 run on the guide rails 19. The mutual engagement of the guide rail 19 and the guide shoe 20 is such that this connection between the guide rails 19 and the guide shoes 20 can also bear a load acting in a vertical direction along the Z axis. The stroke device 13 is mounted on the machine frame 2 accordingly via the guide shoes 20 and the guide rails 19. A further component of the stroke drive device 13 is a wedge gear 21, by means of which the position of the upper tool 11 relative to the lower tool 9 is adjustable.

The lower tool 9 is received moveably along a lower positioning axis 25. This lower positioning axis 25 runs in the direction of the Y axis of the coordinate system of the numerical controller 15. The lower positioning axis 25 is preferably oriented parallel to the upper positioning axis 16. The lower tool 9 can be moved directly on the lower positioning axis 16 by means of a motor drive assembly 26 along the positioning axis 25. Alternatively or additionally the lower tool 9 can also be provided on a stroke drive device 27, which is moveable along the lower positioning axis 25 by means of the motor drive assembly 26. This drive assembly 26 is preferably configured as a spindle drive assembly. The lower stroke drive device 27 can correspond in respect of its structure to the upper stroke drive device 13. The motor drive assembly 26 likewise may correspond to the motor drive assembly 17.

The lower stroke drive device 27 is likewise mounted displaceably on guide rails 19 associated with a lower horizontal frame limb 4. Guide shoes 20 of the stroke drive device 27 run on the guide rails 19, such that the connection between the guide rails 19 and guide shoes 20 at the lower tool 9 can also bear a load acting in the vertical direction. Accordingly, the stroke drive device 27 is also mounted on the machine frame 2 via the guide shoe 20 and the guide rails 19, moreover at a distance from the guide rails 19 and guide shoes 20 of the upper stroke drive device 13. The stroke drive device 27 may also comprise a wedge gear 21, by means of which the position or height of the lower tool 9 along the Z axis is adjustable.

By means of the numerical controller 15, both the motor drives 17 for a traversing movement of the upper tool 11 along the upper positioning axis 16 and the one or more motor drives 26 for a traversing movement of the lower tool 9 along the lower positioning axis 25 can be controlled independently of one another. The upper and lower tool 11, 9 are thus moveable synchronously in the direction of the Y axis of the coordinate system. An independent traversing movement of the upper and lower tool 11, 9 in different directions can also be controlled. This independent traversing movement of the upper and lower tool 11, 9 can be controlled simultaneously. As a result of the decoupling of the traversing movement between the upper tool 11 and the lower tool 9, an increased versatility of the processing of workpieces 10 can be attained. The upper and lower tool can also be configured to process the workpieces 10 in many ways.

Figure 2:
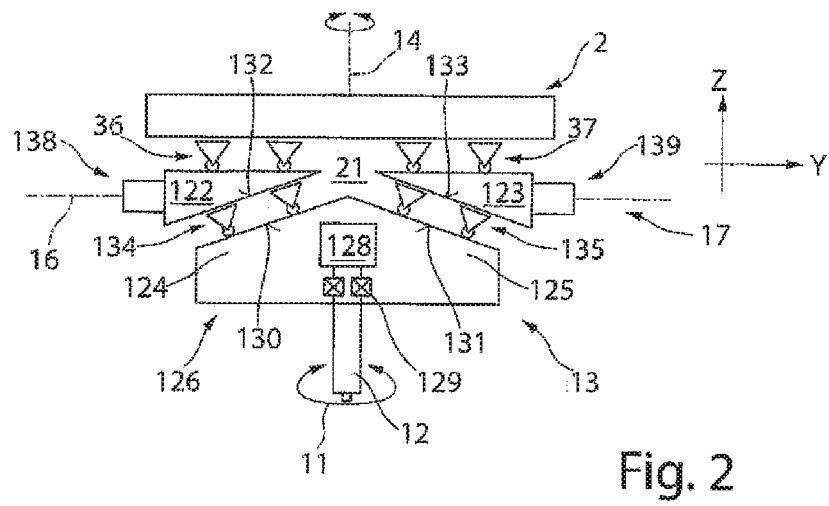
FIG. 2 shows a schematic depiction of the fundamental structure of a stroke drive device and a motor drive according to FIG. 1.

One component of the stroke drive device 13 is the wedge gear 21, which is shown in FIG. 2. The wedge gear 21 comprises two drive-side wedge gear elements 122, 123, and two output-side wedge gear elements 124, 125. The latter are combined structurally to form a unit in the form of an output-side double wedge 126. The ram 12 is mounted on the output-side double wedge 126 so as to be rotatable about the stroke axis 14. A motor rotary drive device 128 is accommodated in the output-side double wedge 126 and advances the ram 12 about the stroke axis 14 as necessary. Here, both a left-handed and a right-handed rotation of the ram 12 in accordance with the double-headed arrow in FIG. 2 is possible. A ram mounting 129 is shown schematically. On the one hand, the ram mounting 129 allows low-friction rotary movements of the ram 12 about the stroke axis 14, and on the other hand the ram mounting 129 supports the ram 12 in the axial direction and accordingly dissipates loads that act on the ram 12 in the direction of the stroke axis 14 in the output-side double wedge 126.

The output-side double wedge 126 is defined by a wedge surface 130, and by a wedge surface 131 of the output-side gear element 125. Wedge surfaces 132, 133 of the drive-side wedge gear elements 122, 123 are arranged opposite the wedge surfaces 130, 131 of the output-side wedge gear elements 124, 125. By means of longitudinal guides 134, 135, the drive-side wedge gear element 122 and the output-side wedge gear element 124, and also the drive-side wedge gear element 123 and the output-side wedge gear element 125, are guided moveably relative to one another in the direction of the Y axis, that is to say in the direction of the positioning axis 16 of the stroke drive device 13.

The drive-side wedge gear element 122 has a motor drive unit 138, and the drive-side wedge gear element 123 has a motor drive unit 139. Both drive units 138, 139 together form the spindle drive assembly 17.

The drive spindle 18 shown in FIG. 1 is common to the motor drive units 138, 139 and is configured in the form of a drive device that is mounted on the machine frame 2 and consequently on the supporting structure.

The drive-side wedge gear elements 122, 123 are operated by the motor drive units 138, 139 in such a way that said wedge gear elements move, for example, towards one another along the positioning axis 16, whereby a relative movement is performed between the drive-side wedge gear elements 122, 123 on the one hand and the output-side wedge gear elements 124, 125 on the other hand. As a result of this relative movement, the output-side double wedge 126 and the ram 12 mounted thereon is moved downwardly along the stroke axis 14. The punch 11 mounted for example on the ram 12 performs a working stroke and in so doing processes a workpiece 10 mounted on the workpiece rest 28, 29 or the workpiece support 8. By means of an opposite movement of the drive wedge elements 122, 123, the ram 12 is in turn raised or moved upwardly along the stroke axis 14.

The above-described stroke drive device 13 according to FIG. 2 is preferably of the same design as the lower stroke drive device 27 and receives the lower tool 9.

Figure 3:
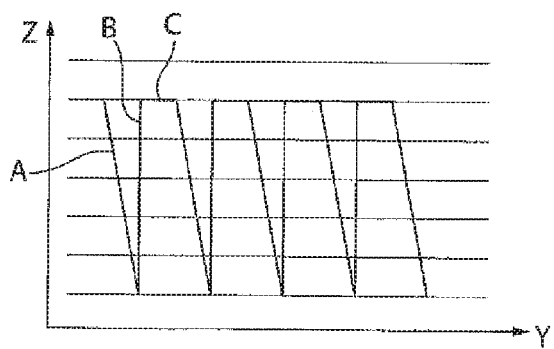
FIG. 3 shows a schematic graph of a superposed stroke movement in the Y and Z direction of the ram according to FIG. 1.

FIG. 3 shows a schematic graph of a possible stroke movement of the ram 12. The graph shows a stroke profile along the Y axis and the Z axis. By means of a superposed control of a traversing movement of the ram 12 along the stroke axis 14 and along the positioning axis 16, an obliquely running stroke movement of the stroke ram 12 downwardly towards the workpiece 10 can, for example, be controlled, as shown by the first straight line A. Once the stroke has been performed, the ram 12 can then be lifted vertically, for example, as illustrated by the straight line B. For example, an exclusive traversing movement along the Y axis is then performed in accordance with the straight line C, in order to position the ram 12 for a new working position relative to the workpiece 10. For example, the previously described working sequence can then be repeated. If the workpiece 10 is moved on the workpiece rest surface 28, 29 for a subsequent processing step, a traversing movement along the straight line C may also be spared.

The possible stroke movement of the ram 12 on the upper tool 11 shown in the graph in FIG. 3 is preferably combined with a lower tool 9 that is held stationary. Here, the lower tool 9 is positioned within the machine frame 2 in such a way that, at the end of a working stroke of the upper tool 11, the upper and lower tool 11, 9 assume a defined position.

This exemplary, superposed stroke profile can be controlled both for the upper tool 11 and the lower tool 9. Depending on the processing of the workpiece 10 that is to be performed, a superposed stroke movement of the upper tool and/or lower tool 9 can be controlled.

Figure 4:
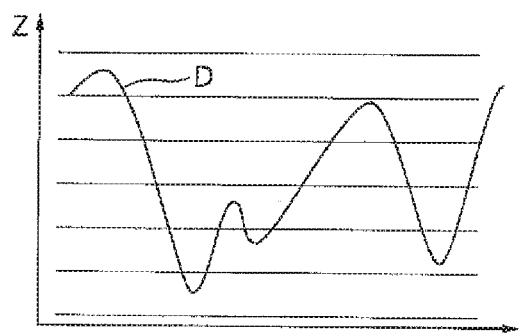
FIG. 4 shows a schematic graph of a further superposed stroke movement in the Y and Z direction of the ram according to FIG. 1.

FIG. 4 shows a schematic graph illustrating a stroke movement of the ram 12 in accordance with the line D, shown by way of example, along a Y axis and a Z axis. In contrast to FIG. 3, it is provided in this exemplary embodiment that a stroke movement of the ram 12 can pass through a curve profile or arc profile by controlling a superposition of the traversing movements in the Y direction and Z direction appropriately by the controller 15. By means of a versatile superposition of this kind of the traversing movements in the Y direction and Z direction, specific processing tasks can be performed. The control of a curve profile of this kind can be provided both for the upper tool 11 and/or lower tool 9.

Figure 5:
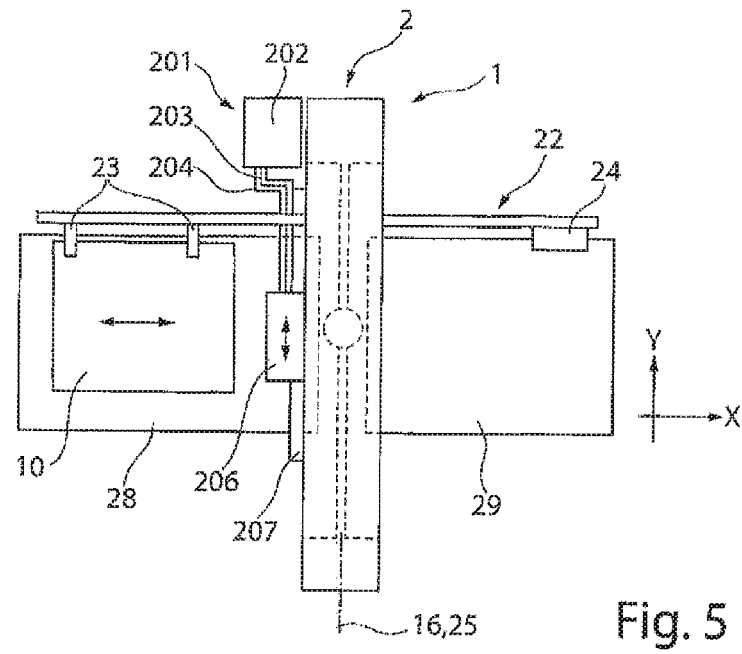
FIG. 5 shows a schematic view from above of the machine tool according to FIG. 1 with workpiece rest surfaces.

FIG. 5 shows a schematic view of the machine tool 1 according to FIG. 1. Workpiece rests 28, 29 extend laterally in one direction each on the machine frame 2 of the machine tool 1. The workpiece rest 28 can, for example, be associated with a loading station (not shown in greater detail), by means of which unprocessed workpieces 10 are placed on the workpiece rest surface 28. A feed device 22 is provided adjacently to the workpiece rest surface 28, 29 and comprises a plurality of grippers 23, in order to grip the workpiece 10 placed on the workpiece rest 28. The workpiece 10 is guided through the machine frame 2 in the X direction by means of the feed device 22. The feed device 22 may also preferably be controlled so as to be moveable in the Y direction. A free traversing movement of the workpiece 10 in the X-Y plane may thus be provided. Depending on the work task, the workpiece 10 may be moveable by the feed device 22 both in the X direction and against the X direction. This movement of the workpiece 10 can be adapted to a movement of the upper tool 11 and lower tool 9 in and against the Y direction for the processing work task at hand.

The further workpiece rest 29 is provided on the machine frame 2 opposite the workpiece rest 28. This further workpiece rest can be associated, for example, with an unloading station. Alternatively, the loading of the unprocessed workpiece 10 and unloading of the processed workpiece 10 having workpieces 81 can also be associated with the same workpiece rest 28, 29.

The machine tool 1 may furthermore comprise a laser processing device 201, in particular a laser cutting machine, which is shown merely schematically in a plan view in FIG. 5. This laser processing device 201 may be configured, for example, as a $CO_2$ laser cutting machine. The laser processing device 201 comprises a laser source 202, which generates a laser beam 203, which is guided by means of a beam guide 204 (shown schematically) to a laser processing head, in particular laser cutting head 206, and is focused therein. The laser beam 204 is then oriented perpendicularly to the surface of the workpiece 10 by a cutting nozzle, in order to process the workpiece 10. The laser beam 203 acts on the workpiece 10 at the processing location, in particular cutting location, preferably jointly with a process gas beam. The cutting point, at which the laser beam 203 impinges on the workpiece 10, is adjacent to the processing point of the upper tool 11 and lower tool 9.

The laser cutting head 206 is moveable by a linear drive 207 having a linear axis system at least in the Y direction, preferably in the Y and Z direction. This linear axis system, which receives the laser cutting head 206, can be associated with the machine frame 2, fixed thereto or integrated therein. A beam passage opening 210 is provided in the workpiece rest 28, below a working space of the laser cutting head 206. A beam capture device for the laser beam may be provided preferably beneath the beam passage opening 210. The beam passage opening 210 and as applicable the beam capture device can also be configured as one unit.

The laser processing device 201 may alternatively also comprise a solid-state laser as laser source 202, the radiation of which is guided to the laser cutting head 206 with the aid of a fiber-optic cable.

Figure 6:
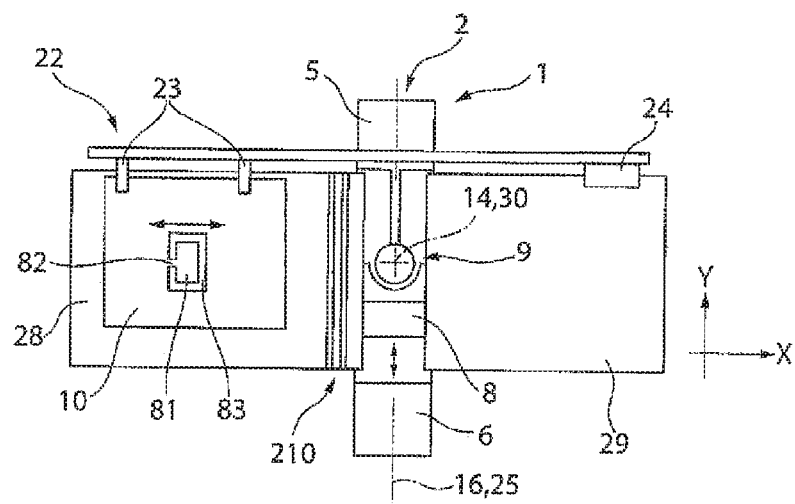
FIG. 6 shows a schematic sectional view of the machine tool along the line VI-VI in FIG. 1 of the workpiece rest surface associated with the machine base frame.

FIG. 6 shows a schematic sectional view along line VI-VI in FIG. 1. In this view of the machine tool 1, the vertical frame limbs 5 and 6 and the upper horizontal frame limb 3 have been masked out. This view shows that the workpiece rest 28, 29 extends until directly at a workpiece support 8, which at least partially surrounds the lower tool 9. Within a resultant free space created therebetween, the lower tool 9 is moveable along the lower positioning axis 25 in and against the Y direction. Furthermore, the beam passage opening 210 in the workpiece rest 28 is shown, if this machine tool 1 is equipped with a laser processing device 21.

For example, a processed workpiece 10 lies on the workpiece rest 28 and has a workpiece part 81 cut free by a cutting gap 83, for example by punching or by laser beam processing, apart from a remaining connection 82. The workpiece 81 is held in the workpiece 10 or the remaining sheet skeleton by means of this remaining connection. In order to separate the workpiece part 81 from the workpiece 10, the workpiece 10 is positioned by means of the feed device 22 relative to the upper and lower tool 11, 9 for a separation and discharge step. Here, the remaining connection 82 is separated by a punching stroke of the upper tool 11 relative to the lower tool 9. The workpiece part 81 can, for example, be discharged downwardly by partially lowering of the workpiece support 8. Alternatively, in the case of larger workpiece parts 81, the cut-free workpiece part 81 can be transferred back again to the workpiece rest 28 or onto the workpiece rest 29 in order to unload the workpiece part 81 and the sheet skeleton. Small workpiece parts 81 may also be discharged optionally through an opening in the lower tool 9.

Figure 7:
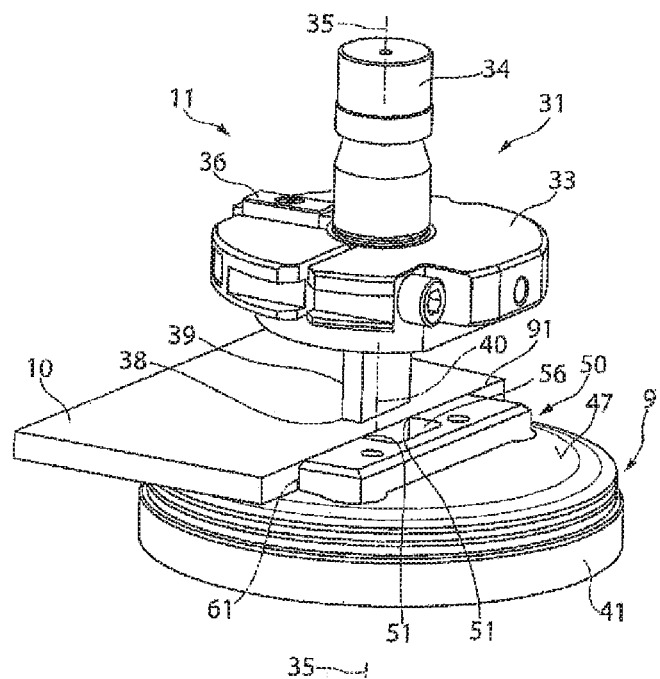
FIG. 7 shows a perspective view of a first embodiment of a tool for the machine tool according to FIG. 1.
Figure 8:
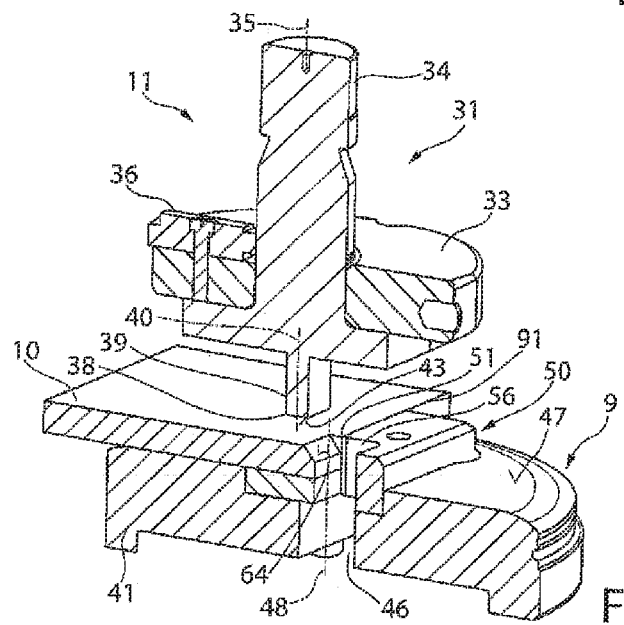
FIG. 8 shows a schematic sectional view of the tool according to FIG. 7, FIGS. 9a-9d schematically show simplified views of the tool according to FIG. 7 for producing workpiece edges on the workpiece to be processed.

FIG. 7 shows a perspective view of a tool 31, which for example can be used in order to process workpieces 10 in the machine tool 1. FIG. 8 shows a schematic sectional view of FIG. 7. This tool 31 comprises an upper tool 11 and a lower tool 9. The upper tool 11 comprises a main body 33 and a clamping pin 34. These are arranged symmetrically with respect to a common positioning axis 35. Furthermore, an indexing wedge 36 for aligning the upper tool in the ram 12, or in a tool receptacle on the machine tool 1, is provided on the main body 33. In this exemplary embodiment it is provided that a main body 33 is formed as a clamping ring, such that under clamping the clamping shaft 34 and advantageously a tool body 39 arranged thereon integrally is held in a clamped manner. Alternatively, the main body 31 and/or tool body 39 and/or the clamping shaft 34 can be formed in one piece. A longitudinal axis 40 of the tool body 39 extends in the positioning axis 35. Alternatively, the tool body 39 or the longitudinal axis 40 of the tool body 39 can also be provided laterally offset in relation to the positioning axis 35. A cutting edge 38 is preferably formed at the lower end of the tool body 39. In the case of this tool body 39 a punch surface 43 is formed at right angles to the longitudinal axis 40, and it is possible for one, two, three or four cutting edges 38 to be formed on said punch surface.

The lower tool 9 comprises a main body 41, which on its upper side has a rest surface 47 for resting the workpiece 10. An opening 46 is preferably provided within the main body 41 and passes through the main body 41 fully. In this exemplary embodiment an adjustment element (not shown in greater detail) is provided on the main body 41 and for example may protrude relative to the outer circumference of the main body 41 in order to adjust this lower tool 9 in respect of its orientation about a positioning axis 48.

In this exemplary embodiment the lower tool 9 comprises a counter cutting insert 50, which is fastened releasably to the main body 41. This counter cutting insert 50 comprises at least one counter cutting edge 51. This counter cutting edge 51 is preferably oriented towards the opening 46.

Furthermore, this counter cutting insert 50 is raised relative to the rest surface 47, such that a support surface 61 is formed adjacently to the counter cutting edge 51, against which support surface the workpiece 10 bears for a subsequent processing operation. In the exemplary embodiment two counter cutting edges 51 arranged at a distance from one another are provided and are separated from one another in a spaced-apart manner by a U-shaped recess.

The workpiece 10, which is ready for processing, has a right-angled workpiece edge 91. This workpiece edge 91 is to be chamfered, or is to be provided with a chamfer 64.

The production of the chamfer 64 and also alternative embodiments of a chamfer 64 will be described in greater detail hereinafter with reference to FIGS. 9a to 9d. For these alternative embodiments an upper tool 11 and lower tool 9 according to FIGS. 7 and 8 are used. In order to produce a chamfer 64, the workpiece 10 is oriented relative to the lower tool 9 in respect of a support surface 61. For a subsequent working stroke the upper tool 11 is oriented in respect of its positioning axis relative to the positioning axis 48 of the lower tool 9. A working stroke is then performed. This may comprise at least two, preferably three, stroke phases. In a first stroke phase the upper tool 11 is lowered and moved towards the lower tool, until a cutting edge 38 of the tool body 39 comes to rest on a surface of the workpiece 10 or assumes a position slightly above the workpiece 10. The second stroke phase is then initiated in that the upper tool 11 is controlled with a linear stroke movement according to arrow A, which for example has an angle β of 45° to the stroke axis 14. The workpiece edge 91 is thus sheared off or removed in order to form the chamfer 64. Once the cutting edge 38 of the tool body 39 is in line with the end face of the workpiece 10, the working stroke can be terminated, or a third stroke phase can be initiated, in which for example a movement along the stroke axis 14 is performed in order to completely remove any sheared-off material as appropriate, as shown in FIG. 9b.

Figure 9A:
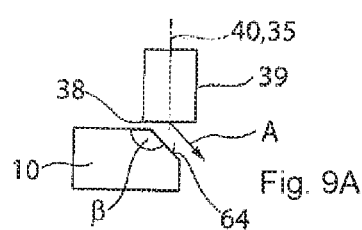

Alternatively to the above-described sequence of a first working stroke, it may be provided that, once the workpiece 10 has been positioned on the support surface 61 of the lower tool 9, a working stroke with a first stroke phase is performed to the effect that a first stroke phase is initiated starting from the last-assumed position of the upper tool 11, such that the tool body 39 is positioned directly above the surface of the workpiece 10, as is shown in FIG. 9a. This first stroke phase may already have a superposed movement formed from a Y direction and Z direction.

Alternatively, it may also be provided that the lower tool 9 is positioned relative to the upper tool 11, wherein it is advantageously still ensured by means of the feed device 22 that the workpiece 10 rests on the support surface 61.

Figure 9C:
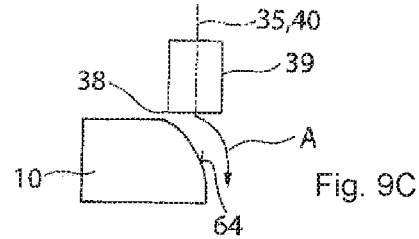
Figure 9B:
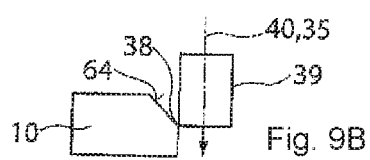

FIG. 9c shows an alternative embodiment as compared to FIGS. 9a and 9b. The chamfer 64 provided on the workpiece 10 in FIG. 9c is rounded or has an arcuate profile. In order to produce a chamfer 64 of this kind, the control of the second stroke phase differs from the above-described second stroke phase in FIG. 9a. Here, it is provided that the upper tool 11 is controlled with a superposed stroke movement along the stroke axis 14 and traversing movement along the positioning axis 16, such that the cutting edge 38 follows an arcuate or curved profile. The arcuate chamfer 64 is thus created. The profile of the chamfer 64 or the curvature of the chamfer 64 is dependent on the proportions of the stroke movement along the stroke axis 14 and of the traversing movement along the positioning axis 16 in the superposition of said movements.

Figure 9D:
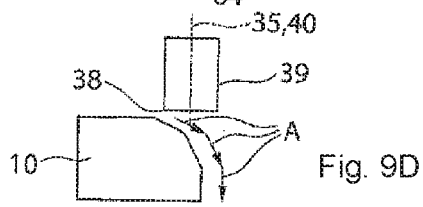

FIG. 9d shows an alternative embodiment as compared to FIG. 9a. Here, it is provided that during the second stroke phase not only is a traversing movement for forming a linear chamfer 64, for example at an angle of 45°, provided, but that a plurality of chamfers 64 are formed on the workpiece 10. FIG. 9d for example shows two successive chamfers 64 oriented at different angles.

The number of multiple chamfers 64 arranged next to one another and also the angular position thereof can be controlled optionally again by means of the controller 15.

Alternatively, it can be provided that a planar chamfer 64 according to FIG. 9a and a curved chamfer 64 according to FIG. 9c are also combined with one another once or more.

Figure 10:
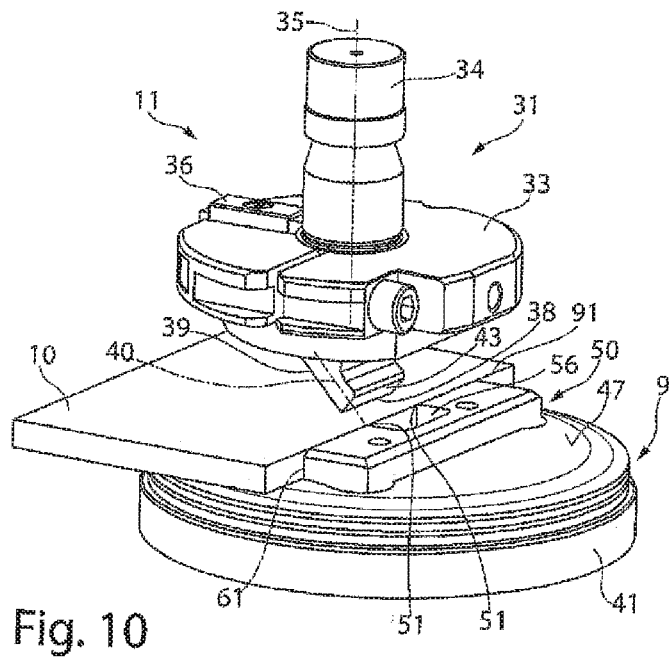
FIG. 10 shows a perspective view of an alternative embodiment of the tool as compared to FIG. 7.
Figure 11:
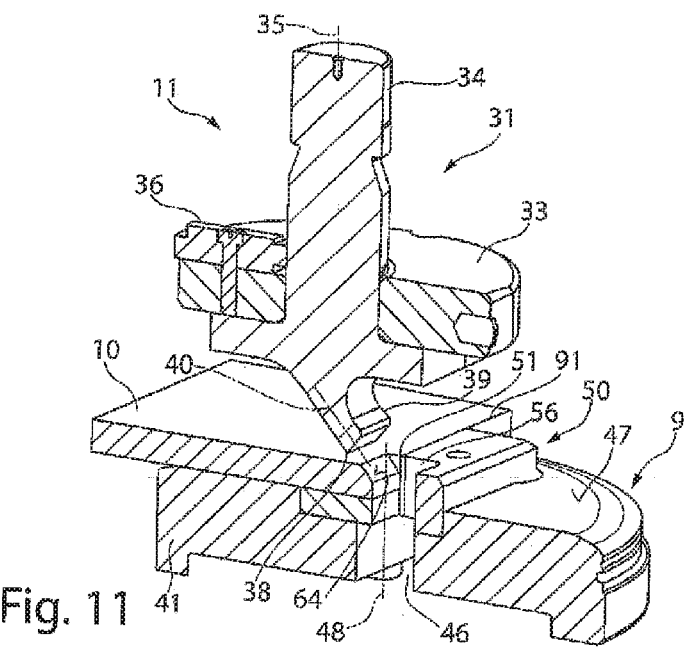
FIG. 11 shows a schematic sectional view of the tool according to FIG. 10, and FIGS. 12a-12f schematically show simplified views of a tool according to FIG. 10 for processing workpiece edges on the workpiece.

FIG. 10 shows a perspective view of an alternative embodiment of an upper tool 11 as compared to FIG. 7. FIG. 11 shows a schematic sectional view of the upper and lower tool 11, 9 in FIG. 10.

This embodiment in FIGS. 10 and 11 deviates from that in FIGS. 7 and 8 insofar as the tool body 39 has a longitudinal axis 40 that lies outside the positioning axis 35. An angle a between 0 and 90° is preferably provided between the positioning axis 35 and the longitudinal axis 40. For the rest, the descriptions for FIGS. 7 and 8 apply.

Various embodiments in which the chamfer 64 can be produced on the workpiece 10 using an upper tool 11 and which comprise a tool body 39 inclined relative to the positioning axis 35 will be described hereinafter with reference to FIGS. 12a to 12f. Here, it is possible that different angular positions of the longitudinal axis 40 relative to the positioning axis 35 also enable the production of part edges or chamfers 64 with the same angular positions.

Figure 12A:
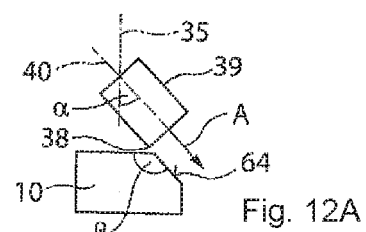

In FIG. 12a the design of a chamfer 64 at an angle β of 45° to the end face, or upper side of the workpiece 10 is shown by way of example. Here, a tool body 39 of which the longitudinal axis 40 is oriented by an angle a of 45° relative to the positioning axis 35 is used.

The embodiments of a working stroke described in relation to FIGS. 9*a* and 9*b* also apply in the present case. The second stroke phase of the working stroke for producing the chamfer 64 from an angle β of 45° is advantageously controlled, in the case of a tool body 39 of which the longitudinal axis is oriented at an angle a of 45° relative to the positioning axis 35, to the effect that a linear movement of the stroke in the second stroke phase along the longitudinal axis 40 is controlled such that the longitudinal axis 40 and the movement direction according to the arrow A are congruent.

Figure 12D:
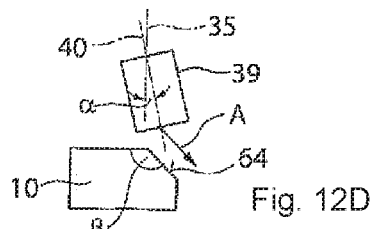
Figure 12B:
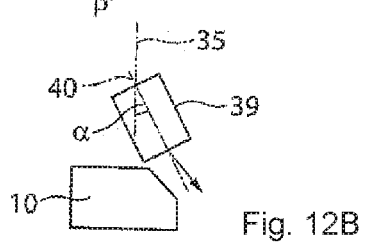

The production of a chamfer 64 at an angle β of 45° on the workpiece 10 according to FIG. 12*b* deviates from the embodiment according to FIG. 12*a* to the effect that, for example, a tool body 39 having a longitudinal axis 40 which has an angle a of, for example, 30° to the positioning axis 35 is used. The movement in accordance with the second stroke phase is performed in accordance with the arrow A with an angle of 45° to the stroke axis 14, such that the traversing movement in the second stroke phase deviates from the longitudinal axis 40 of the tool body 39.

Figure 12E:
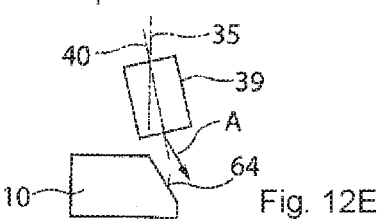
Figure 12C:
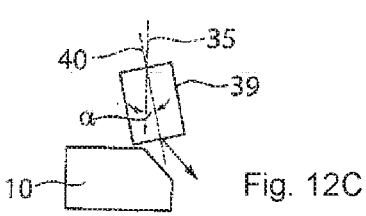

FIG. 12*c* shows a further alternative as compared to FIGS. 12*a* and 12*b*. Again, a chamfer 64 with an angle β of 45° is produced on the workpiece 10. Here, a tool body 39 with a longitudinal axis 40 which lies outside the positioning axis 35 by an angle a of 15° is used on the upper tool 11. The traversing movement according to the arrow A in the second stroke phase corresponds, however, to the traversing movement according to the second stroke phase in the exemplary embodiments according to FIGS. 12*a* and 12*b*.

These embodiments show that a chamfer 64 is produced if the angle a of the longitudinal axis 14 of the tool body 39 to the positioning axis 35 is equal to or less than the angle β that is to be formed for the chamfer 64 on the workpiece 10.

In the following FIGS. 12*d* to 12*f*, further chamfers 64 will be described, which deviate from one another in respect of their angle β and length at the end face of the workpiece 10. In these embodiments according to FIGS. 12*d* to 12*f*, a tool body 39 with a longitudinal axis 40 is used, for example, the longitudinal axis 40 of said tool body being inclined for example by an angle a of 50° relative to the positioning axis 35.

FIG. 12*d* shows an exemplary arrangement of a chamfer 64. Here, the workpiece edge 91 may be broken so to speak. The chamfer 64 is only shallow relative to the height of the end face. The position of the chamfer 64, or the angle β of the chamfer 64 relative to the workpiece surface of the workpiece 10 can again be oriented depending on the orientation of the linear stroke movement of the upper tool 11 in the second stroke phase. For example, a chamfer 64 of 30° is shown.

FIG. 12*e* shows an embodiment in which the chamfer 64 has an angle of 60° relative to the workpiece surface. At the same time, the chamfer 64 for example extends over two thirds of the height of the end face of the workpiece 10.

Figure 12F:
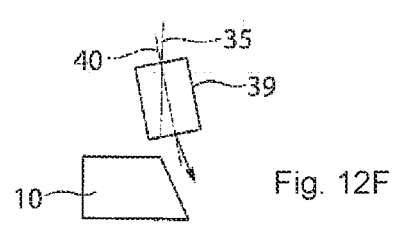

FIG. 12*f* shows a further alternative embodiment for forming a chamfer 64. This chamfer 64 extends for example fully over the entire end face or the thickness of the workpiece 10. The chamfer 64 is for example oriented at an angle of 45° relative to the workpiece surface of the workpiece 10.

The linear stroke movement of the upper tool 11 in the second stroke phase is controlled in accordance with the angle of the chamfer 64 that is to be formed.

In the above-described exemplary embodiments, the lower tool 9 may be still and the working stroke may be performed by the upper tool 11. Alternatively, a swapped control of upper and lower tool 11, 9 may also be provided. The movement parameters may also be divided between the upper and lower tool 11, 9 in order to perform the working stroke. Here, a relative movement of upper and lower tool 11, 9 in the stroke axis 14, 30 and/or along the positioning axis 16, 25 may be performed.

What is claimed is:

1. A planar workpiece processing machine, comprising:
an upper tool moveable along a stroke axis by an upper stroke drive device in a first direction of a planar workpiece to be processed and in a second opposite direction, the upper tool positionable by at least one first motor drive assembly along an upper positioning axis running perpendicular to the stroke axis;
a lower tool oriented relative to the upper tool, the lower tool positionable by at least one second motor drive assembly along a lower positioning axis oriented perpendicular to the stroke axis;
a machine frame, in a frame interior of which the upper tool and the lower tool are moveable; and
a controller configured to control the first motor drive assembly to move the upper tool along the upper positioning axis with an upper traversing movement and to control the second motor drive assembly to move the lower tool along the lower positioning axis with a lower traversing movement,
wherein the upper traversing movement of the upper tool along the upper positioning axis and the lower traversing movement of the lower tool along the lower positioning axis are controllable independently of one another, and
wherein the upper tool is controllable with the upper traversing movement along the upper positioning axis and an upper stroke movement along the stroke axis in a superposed manner.

2. The planar workpiece processing machine of claim 1, wherein the upper traversing movement of the upper tool and the lower traversing movement of the lower tool are controllable simultaneously and, in respect of at least one of a direction of movement and a speed of movement, are controllable independently by the first and second motor drive assemblies, respectively.

3. The planar workpiece processing machine of claim 1, wherein the lower tool is
controllable by a lower stroke drive device to be moveable with a lower stroke movement along the stroke axis in the first direction of the planar workpiece and in the second opposite direction,
wherein the lower tool is controllable to move with the lower stroke movement superposed with the lower traversing movement, and
wherein the upper stroke drive device and the lower stroke drive device are controllable independently of one another.

4. The planar workpiece processing machine of claim 1, wherein, on at least one side of the machine frame, at least one workpiece rest is provided adjacently to the frame interior in a plane perpendicular to the stroke axis, and
wherein the planar workpiece on the at least one workpiece rest is positionable in a rest plane relative to the upper tool and the lower tool for processing.

5. The planar workpiece processing machine of claim 4, wherein a feed device is provided adjacently to the workpiece rest and passing through the frame interior, along which feed device grippers for gripping the planar workpiece are provided moveably, and
    wherein the planar workpiece is displaceable by the feed device grippers in the rest plane of the workpiece rest relative to the upper tool and the lower tool.

6. The planar workpiece processing machine of claim 4, wherein the lower tool is lowerable into a position lowered relative to the rest plane and is transferable from the workpiece rest, and
    wherein the rest plane is closed or closable by the workpiece rest and formed in the frame interior.

7. The planar workpiece processing machine of claim 1, wherein at least one further workpiece processing device is associated with the machine frame or arranged thereon and is moveable in X, Y or Z direction or a combination thereof.

8. The planar workpiece processing machine of claim 7, wherein the workpiece processing device is moveable parallel to the upper tool and the lower tool along an upper horizontal frame limb of the machine frame,
    wherein the workpiece processing device is controlled to be moveable independently of at least one of the upper tool and the lower tool, and
    wherein the controller is configured to control the workpiece processing device.

9. The planar workpiece processing machine of claim 7, wherein the workpiece processing device is a laser processing device having at least one laser processing head moveable along the machine frame,
    wherein the laser processing head is moveable with at least one single-axis linear drive arranged on the machine frame, and
    wherein a beam passage opening is provided in a workpiece rest along a trajectory of the laser processing head.

10. A method of processing planar workpieces by a planar workpiece processing machine, the method comprising:
    positioning a workpiece to be processed between an upper tool and a lower tool;
    moving the upper tool along a stroke axis with an upper stroke movement by a stroke drive device in at least one of a first direction of the workpiece to be processed and a second opposite direction;
    moving the upper tool with an upper traversing movement by at least one first motor drive assembly along an upper positioning axis running perpendicular to the stroke axis;
    moving the lower tool oriented relative to the upper tool with a lower traversing movement by at least one second motor drive assembly along a lower positioning axis oriented perpendicular to the stroke axis; and
    processing the workpiece at least partially by the upper tool,
    wherein the upper tool and the lower tool are movable in a frame interior of a machine frame,
    wherein the first and second motor drive assemblies are actuated by a controller to move the upper tool and the lower tool,
    wherein the upper traversing movement of the upper tool along the upper positioning axis and the lower traversing movement of the lower tool along the lower positioning axis are controlled independently of one another, and
    wherein the upper tool is controlled with the upper traversing movement along the upper positioning axis and the upper stroke movement along the stroke axis in a superposed manner.

11. The method of claim 10, wherein the lower tool is controlled with the lower traversing movement along the lower positioning axis and a lower stroke movement along the stroke axis, the lower traversing movement being superposed with the lower stroke movement.

12. The method of claim 10, wherein the upper tool is controlled with the upper traversing movement and the upper stroke movement in the superposed manner and the lower tool is controlled to be still, such that the upper tool and lower tool after a working stroke are arranged relative to one another in an end position coordinated with one another.

13. The method of claim 10, wherein at least one of the upper tool and the lower tool is controlled with one of a linear stroke movement and a curved or meandering stroke movement, a direction of which lies at least partially outside the stroke axis.

14. The method of claim 10, wherein the upper tool comprises a tool body, wherein a longitudinal axis of the tool body is oriented parallel to the upper positioning axis or lies in the upper positioning axis, and
    wherein the tool body has at least one cutting edge oriented at right angles to the upper positioning axis.

15. The method of claim 14, comprising:
    producing an oblique or curved workpiece edge by feeding the upper tool towards the workpiece along the stroke axis in a first stroke phase of a working stroke and controlling the upper tool with a particular stroke movement in a second stroke phase of the working stroke, wherein the particular stroke movement comprises a linear stroke movement or a curve stroke movement, which lies at least partially outside the stroke axis; and
    removing the produced workpiece edge.

16. The method of claim 15, wherein producing the oblique or curved workpiece edge further comprises:
    controlling the upper tool with a third stroke phase following the second stroke phase by moving the upper tool along the stroke axis for a final separation of material of the workpiece to finish the workpiece edge.

17. The method according to claim 10, wherein the upper tool comprises a tool body, wherein a longitudinal axis of the tool body is oriented inclined relative to the upper positioning axis with at least one cutting edge, and wherein the tool body is oriented at right angles to the upper positioning axis, and
    wherein the method comprises:
        producing an oblique or curved workpiece edge by feeding the upper tool towards the workpiece along the stroke axis in a first stroke phase of a working stroke and controlling the upper tool with a particular stroke movement in a second stroke phase of the working stroke, wherein the particular stroke movement comprises a linear stroke movement or a curved stroke movement, which lies at least partially outside the stroke axis; and
        removing the produced workpiece edge.

18. The method of claim 17, wherein a third stroke phase following the second stroke phase, in which third stroke phase a stroke movement along the stroke axis for a final separation of material of the workpiece to finish the workpiece edge is controlled.

19. The method of claim 10, wherein at least one of the upper tool and the lower tool is oriented relative to one another by the stroke drive device by a rotation about a corresponding positioning axis.

20. The method of claim 10, wherein that the planar workpiece processing machine is held stationary during at least one of a working stroke of the upper tool and a working stroke of the lower tool.

* * * * *